June 3, 1958   M. W. FORBES   2,837,209
RAISIN GATHERING APPARATUS
Filed Jan. 18, 1954   4 Sheets-Sheet 1
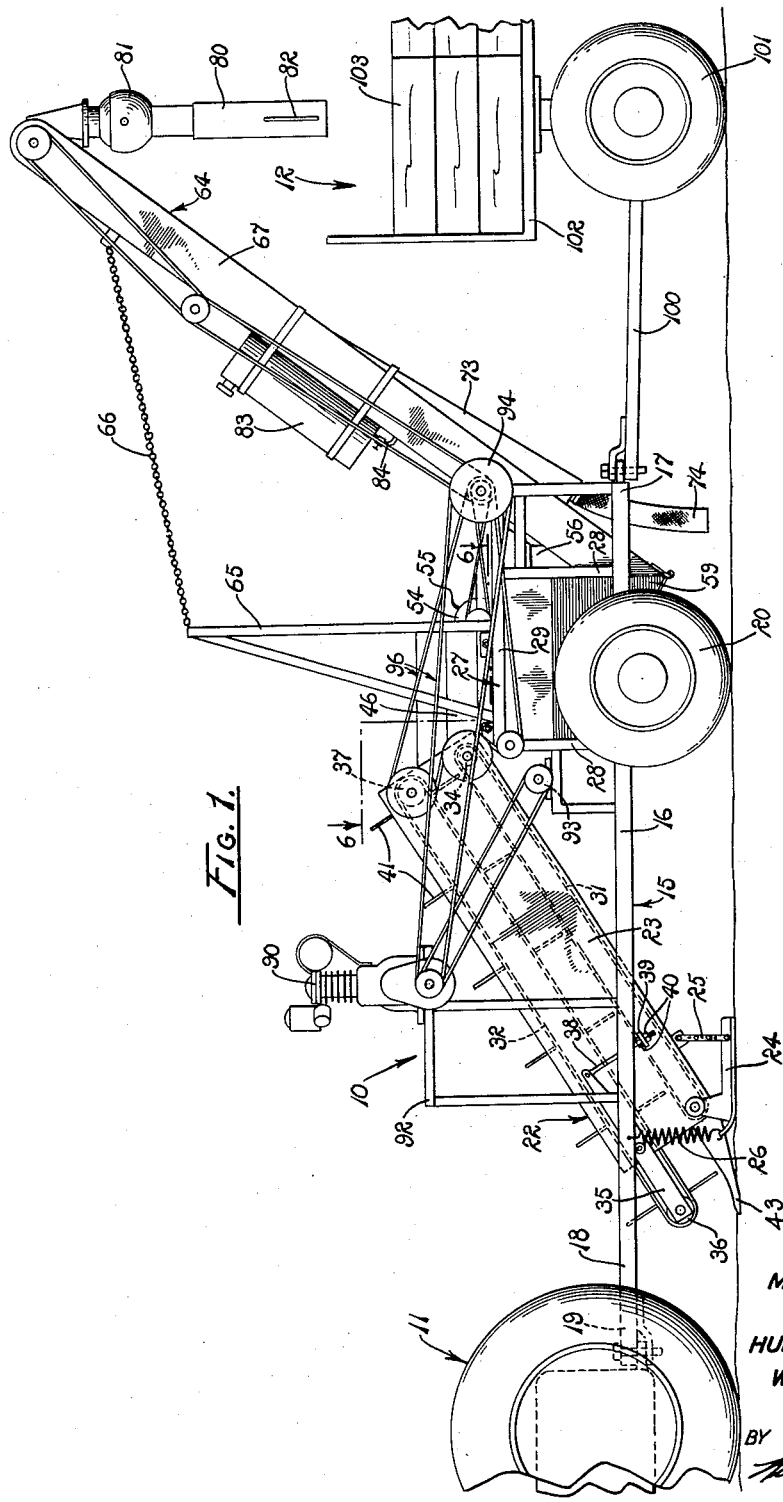
MERLE W. FORBES
INVENTOR
HUEBNER, BEEHLER,
WORREL & HERZIG
ATTORNEYS
BY June 3, 1958  M. W. FORBES  2,837,209
RAISIN GATHERING APPARATUS
Filed Jan. 18, 1954  4 Sheets-Sheet 2
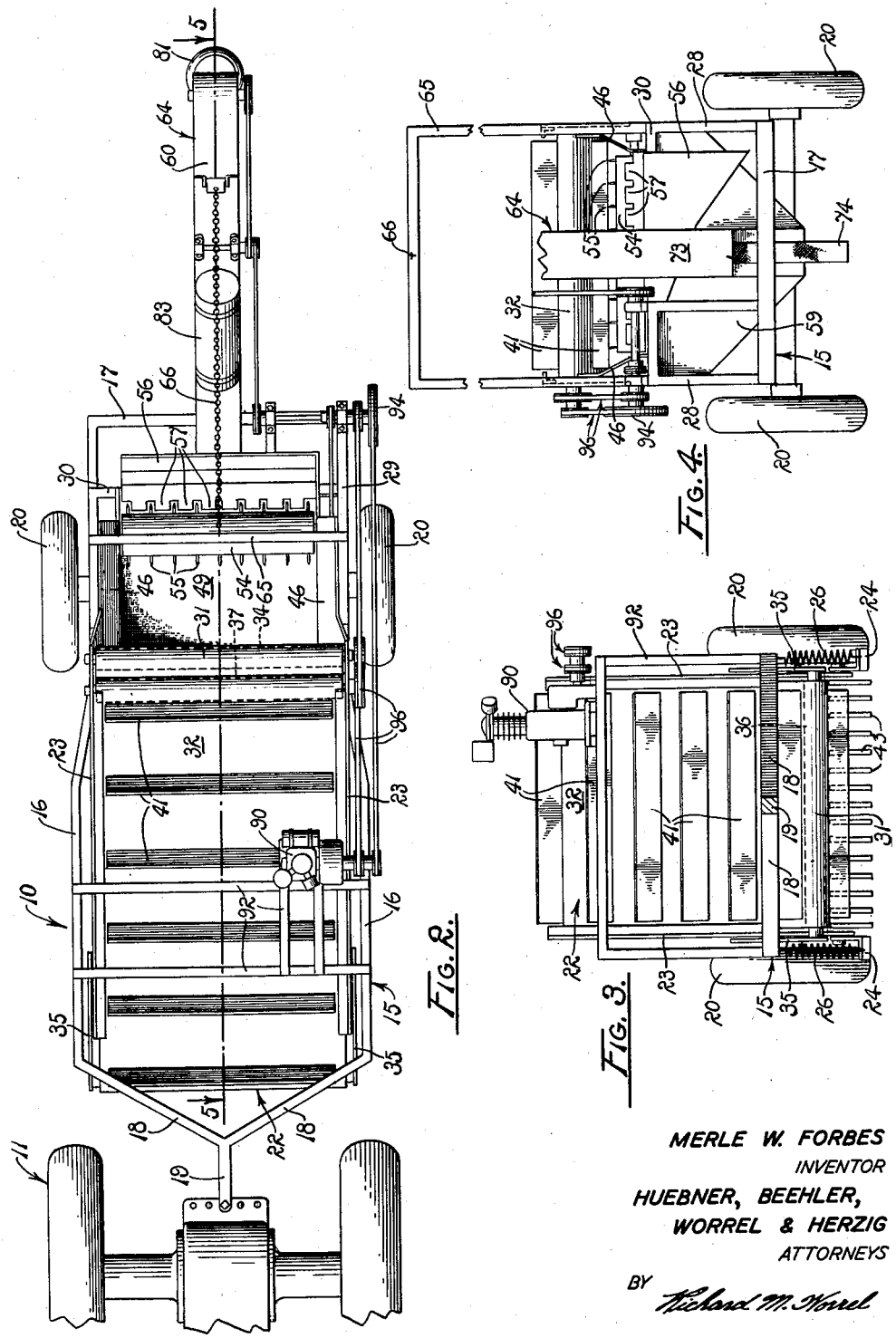
MERLE W. FORBES
INVENTOR
HUEBNER, BEEHLER,
WORREL & HERZIG
ATTORNEYS
BY

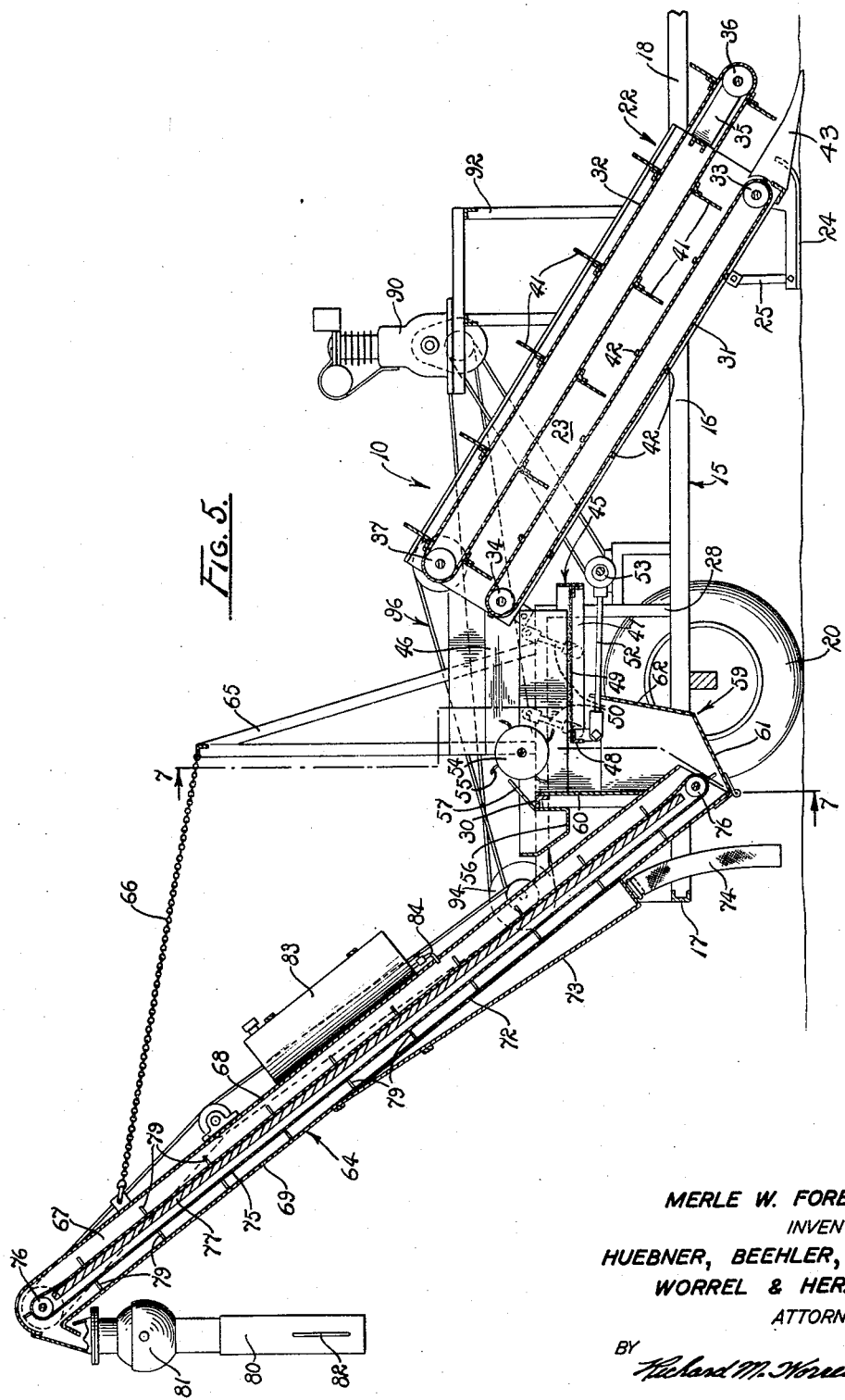

June 3, 1958 M. W. FORBES 2,837,209
RAISIN GATHERING APPARATUS
Filed Jan. 18, 1954 4 Sheets-Sheet 4

MERLE W. FORBES
INVENTOR
HUEBNER, BEEHLER,
WORREL & HERZIG
ATTORNEYS
BY

United States Patent Office 2,837,209
Patented June 3, 1958

2,837,209

RAISIN GATHERING APPARATUS

Merle W. Forbes, Fresno, Calif.

Application January 18, 1954, Serial No. 404,696

12 Claims. (Cl. 209—75)

The present invention relates to a raisin boxing apparatus for use in the separation of raisins from their drying trays and the subsequent boxing thereof.

In the preparation and processing of grapes into raisins the grapes are picked and arranged on flat trays of sheet material, generally of paper or the like, for exposure to the sun. The trays of grapes are usually placed in spaces between the rows of grape vines or on any suitable flat area of ground and are left in this condition to dry. After several days or weeks of drying, depending upon climatic conditions, the trays are turned to invert the raisins disposed thereon and after an additional curing period are rolled or wrapped into a substantially cylindrical shape around their raisins. It sould be noted that many times the trays are not rolled but are collected in flat condition. In any event, whether rolled or flat, the boxing of the raisins cured thereon presents the same general problems.

It has been the practice in the past manually to collect each of the trays of raisins and to empty each of the trays into suitable containers or boxes. This is a time consuming and expensive operation and requires a substantial labor force. Because of frequent labor shortages and because of the highly critical market for raisins wherein the profit margin is sometimes very narrow, if at all existent, the raisin processing industry has long recognized the desirability of automatic machines for collecting the trays of raisins and for separating the raisins from the trays for subsequent discharge into containers or boxes.

Accordingly, an object of this invention is to provide a machine for collecting trays of raisins from the ground.

Another object is to provide in an apparatus of the nature described, an automatic means for separating the raisins from the trays.

Another object is to provide means for depositing raisins separated from trays into boxes or containers.

Another object is to provide in an apparatus of the nature described, means for discharging the empty trays back onto the ground.

Another object is to provide a raisin boxing apparatus wherein dirt, soil or other foreign matter is removed from the raisins prior to the boxing thereof.

It is a further object of this invention to provide a composite machine for lifting trays of raisins from the ground, for separating the trays from the raisins, for disposing of the empty trays and for discharging the raisins in to containers.

These and other objects will be more fully apparent upon reference to the following description.

In the drawings:

Fig. 1 is a side elevation of the raisin boxing apparatus of this invention connected to a tractor or other suitable prime mover and showing a trailer for carrying boxes to receive loose raisins. The tractor and trailer are fragmentarily represented.

Fig. 2 is a top plan view of the structure shown in Fig. 1 except for the trailer.

Fig. 3 is a front elevation of the raisin boxing apparatus showing a draft bar thereof in cross section.

Fig. 4 is a rear elevation of the raisin boxing apparatus showing fragmentary portions of the rear conveyor and upper supporting frame.

Fig. 5 is a vertical longitudinal section taken along line 5—5 of Fig. 2.

Figure 6:
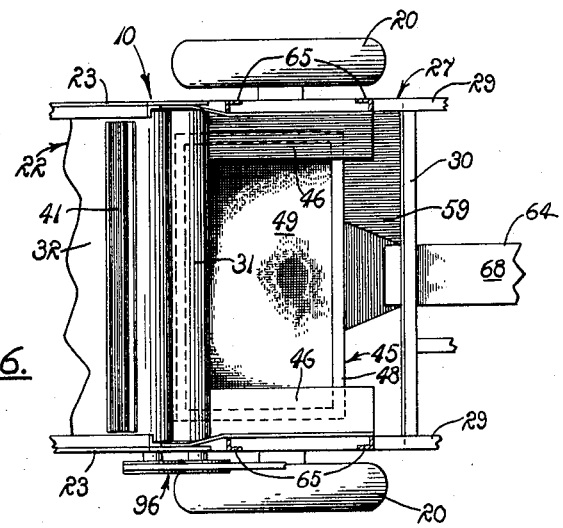
Fig. 6 is a fragmentary horizontal section taken along line 6—6 in Fig. 1.
Figure 7:
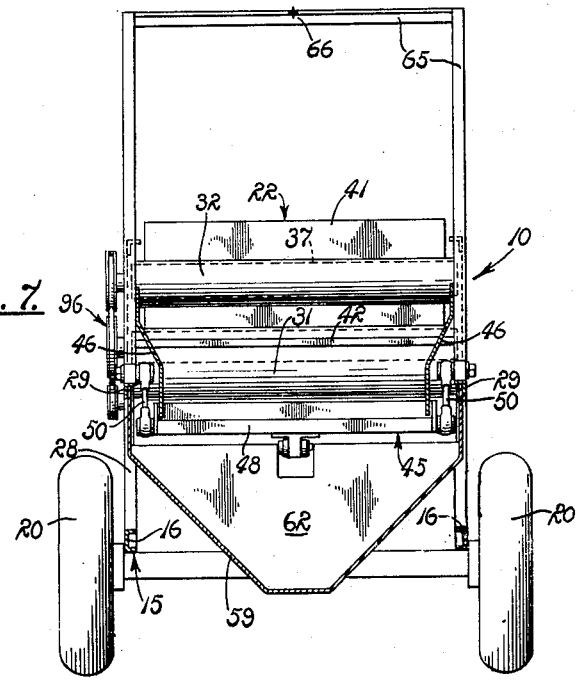
Fig. 7 is a fragmentary section taken at the position indicated by the lines 7—7 of Fig. 5.

Referring more particularly to the drawings:

As shown in Fig. 1, the raisin boxing apparatus is generally denoted by the numeral 10 and is connected for earth traversing movement to a prime mover 11, such as a tractor or the like, and is provided with a trailer 12 for carrying raisin boxes, commonly referred to as "sweat boxes," thereon as will be more fully explained in the subsequent description.

Considering the raisin boxing apparatus 10, as best shown in Figs. 1, 2 and 5, it will be seen to include a support frame 15 having side members 16, a rear member 17 and angularly related front end members 18. Extending forwardly from the front members 18 is a tongue or draw bar 19 for adjustable connection to the tractor 11 in a well-known manner. The frame 15 is supported for earth traversing movement on wheels 20 and is generally rectangular in shape having an opening in the center thereof for supporting in the desired operative manner the various elements of the apparatus. Accordingly, a first or forward conveyor 22 is mounted in a forwardly disposed position in the frame. The conveyor 22 is provided with a pair of side walls 23, which extend rearwardly upwardly relative to the frame. A runner or shoe 24 is pivotally attached at the lower forward end of each side wall 23 for slidably engaging the ground. A link 25 is connected between the rear end of each of the shoes 24 and the respective wall 23 of the conveyor. A cushioning means, such as a spring 26, is connected between each side member 16 of the frame and to the forward end of each shoe 24. An auxiliary frame 27 is supported in upstanding position on the main frame 15 between the wheels 20, its specific construction including spaced upstanding front and rear members 28, a pair of upper substantially horizontal side members 29, and a rear transverse substantially horizontal member 30. The upper rearward portions of the side walls 23 of the conveyor are pivotally connected to the side members 29 of the auxiliary frame 27. Thus, it will be evident that the conveyor 22 is pivotally mounted in the frame 15 and is adapted to slide over the ground on the shoes or runners 24, being cushioned by springs 26 during its travel over the ground.

The conveyor 22 includes a pair of circuitously traveled endless belts 31 and 32 having substantially parallel runs in elevationally spaced adjacent relation. The lower belt 31 is mounted for circuitous travel about a roller 33 rotatably mounted between the rearward ends of the walls. The forward end of the upper belt 32 is supported in adjustably spaced relation to the forward end of the lower belt 31 by a pair of arms 35 pivotally mounted on the walls 23 above the roller 33. Each of the arms 35 has a forwardly extended end and a rearwardly extended end. A roller 36 is rotatably mounted between the forward ends of the arms 35 and a roller 37 is rotatably mounted between the walls 23 above the roller 34. The belt 32 is mounted for circuitous travel on the rollers 36 and 37. The rollers 33, 34, 36 and 37 are arranged in substantially parallel relation. An adjustment bolt 38 is pivotally connected to the rearward end of each arm 35 and slidably extends through an ear 39 mounted on each of the side walls 23 therebelow. Nuts 40 screw threadably mounted on the bolts 38 on opposite sides of the ears 39 permit dependable retention of the arms 35 in adjusted pivoted position.

As will soon become apparent, the conveyor belts 31 and 32 are driven with their adjacent runs traveled upwardly in the conveyor. Pushing elements or paddles 41 are mounted on the upper belt 32 and extend substantially right-angularly therefrom. The paddles serve to aid in the movement of trays of raisins upwardly of the conveyor and are adjustably positioned for cooperative action with the lower belt by the pivotal adjustment of the arms 35. Further dependability of tray conveyance is attained by providing cleats 42 transversely of the belt 31.

The conveyor 22 is also provided with gathering fingers 43 at the lowermost forward portion thereof conveniently rigidly mounted between the side walls 23. The trays of raisins are adapted to be slidably received on the fingers whereupon they are engaged by the paddles 41 for motivation upwardly in the conveyor. By adjusting arms 35, the paddles can be made to sweep closer to the fingers for more effective pickup of the trays. The specific driving means for these conveyor belts will be subsequently described.

Referring more specifically to Fig. 5, it will be noted that the auxiliary frame 27 supports centrally therein a substantially horizontally positioned table 45 beneath the upper discharge end of the conveyor 22 and thus is adapted to receive the trays of raisins which are discharged from the conveyor. Also supported at the sides of the auxiliary frame 27 on the upstanding members 28 and the side members 29, are a pair of deflector plates 46. These plates 46 converge in order to guide trays of raisins discharged from the conveyor into a substantially central position on the table 45.

The table 45 is provided with a substantially rectangular frame 47 having front and side walls and being open at the rear. An angle iron 48 is mounted within the frame and extends completely therearound even between the side walls at the rear of the frame. The angle iron provides a horizontal mounting flange for securely supporting thereon a foraminous screen or wire mesh 49. Although shown and described as foraminous, member 49 could equally as well be a solid sheet of some suitable material, preferably offering a certain amount of frictional resistance to the trays falling thereon. However, when foraminous, as shown it acts to sift off some of the dirt, dust and the like from the raisins.

The table 45 is supported in auxiliary frame 27 by four dependent links, each indicated by numeral 50. Each of these links is pivoted at one end to one of the members 29 at either side of frame 27. The links depend from their connection to the frame and are pivotally connected at the opposite ends thereof to the outside of one of the side walls of table 45, as is clearly apparent in Fig. 5. The connection of the links 50 to member 29 and table 45 is such as to maintain a parallel relation at all positions of movement between each pair of links at either side of the table.

The deflector plates 46 are positioned within the side walls of the table and thus lie between the pairs of links 50. The lower edges of plates 46 are spaced slightly from screen 49 in the lowermost pivoted position of the links to enable the links to pivot upwardly without abutting interference between the plates and the screen. This construction also insures that raisins being jostled or vibrated around on the screen, as well as the trays, do not fall over the sides of the table but are directed rearwardly thereon, as will subsequently be more apparent.

A means for vibrating or oscillating the table 45 is provided and includes a connecting rod 52 pivotally attached at its rearward end to the angle member 48 of the table 45. The opposite end of the connecting rod 52 is attached to an eccentric, generally denoted by the numeral 53, which is rotated by convenient means subsequently described more fully. It will be evident, therefore, that as the connecting rod 52 is moved generally rearwardly and forwardly through the eccentric 53, the table 45, constrained by means of the parallel linkages 50, moves in an arcuate path. The table 45 is preferably continually in a substantially horizontal position and is reciprocated from a lowermost position with the links 50 in a vertical dependent position upon rearward movement of the connecting rod 52, to a rearwardly and upwardly disposed position of maximum elevation wherein the parallel linkages are rearwardly extended. This vibration of the table 45 between the described positions tends to toss the trays rearwardly and upwardly, although not necessarily sufficiently to throw the trays clear of the table and to unwrap or loosen the trays from the raisins. This particular vibrating action also tends to shake the raisins from the trays and to discharge them rearwardly and off the table from the rear open end thereof in an intermittent flow between the plates 46 and off the table from the rear open end thereof.

Extending between members 29 of auxiliary frame 27 rearwardly of links 50 is a rotary cylinder 54 having a plurality of rows of spike-fingers 55 arcuately extended outwardly therefrom. This cylinder 54 is so positioned and the length of said fingers is such that as the cylinder is rotated, the fingers 55 pass immediately above the rear edge of screen 49 without interfering with the reciprocation thereof. The cylinder is rotated counterclockwise, as seen in Fig. 5, and the fingers are adapted to pierce and thus grasp the trays lying on the screen. The trays are lifted upwardly and rearwardly onto a discharge platform 56. This platform is also supported between members 29 and includes a plurality of horizontal spaced bars 57 in order to permit passage of fingers 55 therethrough. The platform is substantially horizontally extended rearwardly of the cylinder 54 and is arcuately curved outwardly and downwardly to provide a discharge end thereon, as best seen in Fig. 2. The fingers 55 carrying a tray elevate the tray onto the platform and then pass through the bars 57 which comb the trays from the fingers and leave the trays on the platform for subsequent pushing or crowding discharge onto the ground by subsequently similarly placed trays.

A hopper 59 is provided with a rear wall 60 rigidly mounted on the upstanding rear members 29 of the auxiliary frame 27. The hopper is also provided with a bottom wall 61 connected to the wall 60 and extended angularly upwardly therefrom in a forward direction. A further wall 62 extends upwardly and forwardly from the lower wall 61 to complete the hopper 59. The bottom wall 61 and forward wall 62 of the hopper are positioned beneath the table 45 and are adapted to receive therein loose raisins which are shaken from the table 45 during its vibration.

A second or rear conveyor 64 is supported rearwardly in the frame and extends through an opening in the rear wall 60 of the hopper and is pivotally connected at its lower end to the bottom wall 61 of the hopper. The auxiliary frame 27 is provided with an upstanding support frame generally indicated at 65. An adjustable chain, or the like, 66 is attached to the upper end of the support frame 65 and extends rearwardly for connection to the conveyor 64. Thus, it will be evident that conveyor 64 may be adjusted in its vertical position by the chain 66 allowing the conveyor 64 to pivot around its connection to the hopper 59. The conveyor 64 is provided with side walls 67, an upper wall 68 and a lower wall 69. The lower wall 69 contains a foraminous screen 72 along a central portion thereof for filtering out the dirt, soil or other foreign matter from the raisins.

A compartment or container 73 is attached beneath the screen 72 for collecting or catching the foreign matter which falls through the screen and a discharge hose 74 of fabric or the like is connected at the lower end of container 73 for discharging the foreign matter onto the ground. It should be noted in this regard that the open end of the hose 74 is disposed adjacent to the ground so that foreign matter such as dirt falling therethrough will not cause undue dust.

The conveyor 64 is provided with a conveyor belt 75 mounted at each end of the conveyor on transverse rollers 76. The conveyor belt 75 travels clockwise, as seen in Fig. 5, over a centrally positioned board 77 of oak wood or other suitable material. The center board 77 is mounted in any convenient manner between the side walls 67 of the conveyor. The conveyor belt 75 is also provided with a plurality of spaced cleats 79 for the usual purpose.

The upper end of the conveyor 64 constitutes the discharge end thereof and accordingly, is provided with a discharge spout 80 connected thereto. The discharge spout 80 is preferably mounted by a universal joint, indicated generally at 81, in order that the spout may assume a variety of angular positions when so moved by means of a handle 82 to discharge to various selected points on the trailer 12.

A means for lubricating the conveyor belt 75 and the paddles 79 consists of a tank 83 mounted on the upper wall 68 of the conveyor. A suitable dispensing spout or spigot 84 is provided for fluid communication between the tank 83 and a position interiorly disposed of the conveyor. It has been found in practice, that a limited amount of water dripping on the conveyor belt and paddles is quite effective in preventing the raisins from adhering thereto.

A gasoline engine 90 is mounted forwardly of the frame 15 on a second auxiliary supporting frame, generally indicated at 92. Suitable driving belts are provided between pulleys on the output shaft of the engine 90 and a pulley 93 adapted to drive the eccentric 53, and a pulley 94 adapted to drive the forward and rearward conveyors 22 and 64, as well as cylinder 54. The pulley 94 constitutes an element of a system 96 of belts and pulleys which serves to drive the conveyors and cylinder 54 in the manner already described. The system is believed to be clearly evident in the drawings and is not described in greater detail.

The trailer 12 is utilized at the rear of the frame 15 and is provided with a draw bar 100, support wheels 101 and a suitable bed 102 for holding a plurality of boxes 103. The trailer is so constructed that when connected to the frame 15, the bed supports the boxes 103 directly beneath the spout 80 or within the swivelling range thereof.

Operation

The operation of the raisin boxing apparatus is believed to be apparent from the foregoing description and is briefly summarized at this point. Assuming that a plurality of trays of raisins either in a folded or rolled condition are supported on the ground in substantial alignment, the tractor is driven so as to straddle the trays of raisins for pickup by the fingers 43 in front of the conveyor 22. At this time the gasoline engine 90 is energized to actuate the various conveyor belts and the vibrating means for the table 45. It will be noted that, as viewed in Fig. 5, the conveyor belt 31 rotates in a counterclockwise direction, the conveyor belt 32 rotates in a clockwise direction and the conveyor belt 75 rotates in a clockwise direction. Thus, as the frame 15 is drawn over the ground the conveyor 22 slides along the ground and receives the trays on the gathering fingers so that they may be fed to the conveyor belt 31. The paddles 41 on belt 32 sweep around at spaced intervals to urge the trays onto the fingers and onto belt 31. As the trays are lifted upwardly in conveyor 22 they are prevented from returning downwardly by means of the paddles 41 and the cleats 42 on conveyor belt 31. It should also be evident that if any raisins become loose or escape from the trays, these paddles and strips also aid in preventing their loss.

The trays of raisins are discharged from the conveyor 22 onto the table 45, being guided downwardly onto the screen 49 thereof by means of the side deflector plates 46. As above noted, the deflector plates 46 are positioned inwardly of the extending side walls of the table 45 so that proper placement of the trays on the table is insured. The eccentric 53 through the connecting rod 52 reciprocates the table 45 from a rest position to a position rearwardly and upwardly thereof, as previously described. Thus, when each of the trays of raisins, whether rolled or in flat condition, hits the screen 49 as it falls from the conveyor 22, it is immediately subjected to vigorous vibration. Assuming that the trays are in a rolled condition, this vibration acts to loosen, unwrap or unroll the trays to discharge their contents. This vibration also tends to loosen and shake the raisins into a loose condition on the screen.

When the raisins have been shaken loose from the trays on table 45, they are discharged rearwardly and downwardly from the table by its tossing action. It should also be noted that the foraminous construction of screen 49 aids in sifting out much of the foreign matter, such as soil, dirt and the like from raisins and for discharge onto the ground. In this connection it should be observed that the openings in the screen are smaller than the raisins but of adequate size to pass all dirt and debris of particle size much smaller than the raisins.

The trays are likewise caused to move rearwardly on the screen 47 by its reciprocating action and into engagement with the rotating fingers 55 of the cylinder 54. As explained above, the fingers 55 are sharp and thus adapted to pierce the trays upon engagement therewith. The trays are lifted rearwardly and upwardly from the table 45 by the fingers and onto the discharge platform 56. Because of the downward sloping of the platform 56, the trays are slidably discharged onto the ground.

The raisins discharged from screen 49 at the rearward end of table 45, fall into the hopper 59. The clockwise rotation of the conveyor belt 75 and thus the paddles 79 thereon, pick up the raisins in hopper 59 and lift them upwardly over the bottom wall 69 of conveyor 64. During the raisins' transit upwardly in conveyor 64, and over the foraminous portion 72 of wall 69 they are again cleansed of dirt and the like which falls through the screen 72 into container 73 for subsequent discharge through the hose 74. Furthermore, as the conveyor belt 75 rotates, it is constantly moistened by water dripping from the spigot 84 connected to the tank 83. This prevents the conveyor belt and paddles thereon from adhering to the conveyor belt and insures a smooth running operation. The raisins are discharged at the upper end of conveyor 64 into the discharge spout 80. Depending upon the angular orientation of the spout 80, the raisins are directed into selected boxes 103 on the trailer 12.

From the foregoing description it will be apparent that a composite machine has been provided which performs the combined functions of collecting and lifting trays of raisins from the ground, separating the raisins from the trays, disposing of the empty trays, and discharging the raisins into suitable containers or boxes. Furthermore, the apparatus acts to remove dirt and the like from the raisins prior to their discharge into the containers or boxes in a manner conducive to higher quality.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an apparatus for use in gathering wrapped materials disposed on a support surface and segregating the materials from their wrappings, the combination of a frame adapted for earth traversing movement, a conveying means mounted in the frame having a pickup end for lifting the wrapped materials off of the support surface and a discharge end for depositing the wrapped materials centrally of the frame, a table supported in the frame adjacent to the discharge end of the conveyor for receiving the wrapped materials, drive means mounted in the frame and connected to the table for reciprocating the table to unwrap the materials and to shake the materials free of their wrappings and from the table, wrapper removing means mounted on the frame adjacent to the table having an engaging member movable past the table for engaging and withdrawing wrappers from the table, driving means mounted on the frame having driven connection to the wrapper removing means, and means mounted on the frame beneath the table for catching the materials shaken from their wrappings.

2. An apparatus for use in gathering wrapped materials disposed on a support surface and segregating the materials from their wrappings comprising an earth traversing support frame, a pickup means mounted forwardly on the frame for receiving successive packages of wrapped materials and lifting them from the support surface, a table mounted centrally of the frame, means mounted in the frame for conveying the packages from the pickup means to the table, drive means mounted in the frame connected to the table for vibrating the table to shake the materials loose from their wrappings and the materials off the table, rotary means mounted in the frame adjacent to the table for engaging the wrappings and removing them from the table, means mounted below the table in the frame for receiving the loose materials shaken from the table, and adjustably positioned conduit means mounted on the frame for movement relative thereto and communicating with the receiving means for delivering the loose materials to selected points of discharge.

3. A raisin boxing apparatus for use in lifting trays of raisins from the ground, for separating the raisins from the trays and for depositing the raisins into containers comprising a frame mounted for earth traversing movement along a line of trays disposed on the ground, a table supported centrally in the frame, a conveyor mounted forwardly on the frame and having an upper discharge end and a lower pickup end, said discharge end being disposed in the frame above the table and said pickup end being disposed adjacent to the ground for receiving the trays of raisins, drive means mounted in the frame and connected to the table for imparting a vibratory reciprocal motion to the table to shake the raisins from the trays, means rotatably mounted in the frame adjacent to the table for engaging the trays thereon and lifting the trays therefrom, a chute mounted in the frame adjacent to the engaging means for receiving trays therefrom, a hopper mounted in the frame beneath the table for receiving loose raisins shaken therefrom, and means mounted in the frame in communication with the hopper for conveying raisins therefrom for deposit into containers.

4. An apparatus for lifting quantities of raisins wrapped in trays of sheet material, for separating the raisins from the trays for subsequent boxing of the raisins comprising a frame, a first conveyor mounted forwardly in the frame for elevating the trays of raisins upwardly into the frame, a second conveyor having a raisin receiving portion and a raisin discharge portion mounted on the frame rearwardly of the first conveyor, a table supported in the frame intermediate the conveyors for receiving the trays of raisins from the first conveyor and for discharging loose raisins into the raisin receiving portion of the second conveyor and rotary means mounted in the frame adjacent to the table for engaging and lifting the trays from the table for discharge thereof.

5. An implement for use in raisin gathering wherein the raisins are disposed in trays spaced in substantial alignment on the ground comprising a frame mounted for earth traversing movement along the aligned trays, a conveyor having an upper discharge end and a lower pickup end mounted forwardly in the frame in substantial alignment with the direction of earth traversing movement of the frame adapted to elevate the trays of raisins from the ground upwardly to the discharge end of the conveyor, a table supported in a substantially horizontal position on the frame beneath the discharge end of the conveyor for receiving trays of raisins discharged therefrom, drive means supported on the frame operatively connected to the table for oscillating the table rearwardly and upwardly and downwardly and forwardly along an arcuate path for separating the raisins from the trays and for shaking the raisins off of the table, rotary means mounted in the frame adjacent to the table for engaging the trays thereon and for removing the trays from the table, and means mounted in the frame adjacent to the table for receiving loose raisins shaken from the table.

6. A raisin boxing apparatus for use in separating raisins from trays which have been previously rolled in the trays and disposed on the ground comprising a supporting frame mounted for earth traversing movement, a first conveyor mounted forwardly in the frame and having means positioned adjacent to the ground for sliding beneath the trays of raisins and lifting them upwardly thereon, said conveyor having an upper discharge end elevationally and rearwardly spaced from the pickup means for depositing the trays of raisins centrally of the frame, a second conveyor mounted rearwardly in the frame in spaced relation to the first conveyor and having a lower raisin receiving portion and an upper raisin discharge portion, a table supported in a substantially horizontal position in the frame intermediate the discharge end of the first conveyor and the raisin receiving portion of the second conveyor, a pair of spaced links pivotally interconnecting the frame and the table, means connected to the table for reciprocally pivoting said links between a substantially vertical position and a position rearwardly angularly related to said vertical position so as to reciprocally vibrate the table along a path of movement constrained by the links thereby to separate the trays from the raisins and to shake the raisins into the raisin receiving portion of the second conveyor, a rotary cylinder mounted adjacent to the table having a plurality of peripherally spaced fingers thereon adapted to engage the trays on said table for upward lifting thereof, means for rotating the cylinder, and a comb-like discharge platform mounted on the frame adjacent to said cylinder for receiving the trays therefrom.

7. A raisin boxing apparatus for use in separating raisins from trays in which they have previously been wrapped and disposed on the ground comprising a support frame; a conveyor mounted forwardly in the frame and having an upper discharge end and a lower pickup end, said pickup end being disposed in ground engagement for slidable reception of the trays thereon; a table mounted in the frame in a substantially horizontal position beneath the discharge end of the conveyor; a pair of links pendantly mounted on the frame in parallel relation on each side of the table and pivotally connected to both the table and to the frame; means for oscillating the table between a horizontal position wherein the links are in a vertical position and an upwardly rearwardly disposed horizontal position wherein the links are rearwardly angularly disposed relative to their vertical position; a toothed cylinder mounted above the table along the rearward portion thereof; means for rotating the cylinder whereby the teeth thereon engage the trays on the table and lift said trays upwardly from the table; a discharge platform rearwardly and upwardly positioned from the toothed cylinder for receiving the trays engaged thereby and for discharging the empty trays back onto the ground; and means disposed rearwardly beneath the table for receiving loose raisins shaken from the table by said oscillating means.

8. A raisin boxing apparatus for use in separating raisins from trays in which they have been wrapped and rested on the ground comprising a frame mounted for earth traversing movements; a first conveyor mounted in the frame and adapted to elevate the trays of raisins upwardly into the frame; a table mounted in the frame for receiving the trays of raisins from the first conveyor; means mounted in the frame connected to the table for vibrating the table to separate the trays from the raisins and for shaking the raisins rearwardly from the table, means mounted in the frame located in operative relation to the table for lifting the empty trays from the table; a second conveyor having an upper discharge end and a lower end, the lower end including means for receiving loose raisins shaken from said table; means on the second conveyor for lubricating the conveyor to prevent adhering of the raisins thereto, said second conveyor having a lower foraminous wall; means mounted on the lower wall of the conveyor for collecting foreign matter sifting through the wall from the raisins during elevation in the conveyor; a discharge tube communicating with the collecting means and having an open end disposed adjacent to the ground; and a movable discharge spout connected to the discharge end of the second conveyor for directing the loose raisins from the second conveyor to selected points of discharge.

9. In an apparatus adapted to segregate wrapped materials from their wrappings, the combination of a frame, a substantially horizontal table, means mounting the table in the frame for reciprocal movement between a lowermost position and a second position horizontally and elevationally spaced therefrom, driving means supported on the frame connected to the table and reciprocating the table between its positions whereby the materials are shaken from their wrappings and the materials and wrappings are caused to travel across the table substantially in the direction of movement of the table from its lowemost to its second position for discharge therefrom, and rotary means mounted in the frame adjacent to the table for engaging the wrappings and removing them from the table.

10. In an apparatus adapted to segregate raisins from paper trays in which they are wrapped having a support frame, the combination of a substantially horizontal table, a plurality of substantially parallel links pivotally mounted in the frame and pivotally connected to the table in supporting relation thereto, driving means connected to the table and reciprocating the table between a position with the links substantially vertically downwardly extended in the table and a position with the links pivoted upwardly therefrom whereby trays of raisins deposited on the table are shaken from their raisins and the trays and raisins caused to move across the table substantially in the direction of movement of the table from its lowermost position to the position horizontally and elevationally spaced therefrom, a roller rotatably mounted in the frame adjacent to the side of the table toward which the raisins and trays tend to move, pointed arcuate fingers peripherally extended from the roller for snagging engagement with trays on the table, means for rotating the roller to pick trays from the table, and a comb mounted adjacent to the roller for passage of the fingers therethrough to remove the trays from the fingers.

11. An apparatus for use in separating wrapped materials from their wrappings, which wrapped materials are disposed on a support surface, comprising a support frame, a conveyor mounted in the frame having an upper discharge end and a lower pick-up end positioned adjacent to the support surface for reception of wrapped materials thereon, a table, links pendently mounted on the frame and pivotally connected to both the table and the frame mounting the table beneath the discharge end of the conveyor, means connected to the table for oscillating the table between a first position wherein the links are in substantial vertical position and a second position pivoted upwardly from said first position away from the conveyor, a toothed member mounted in the frame above the table in adjacent relation thereto, drive means connected to the toothed member for moving such member in a circuitous path whereby the teeth thereon engage the wrappings on the table and lift said wrappings upwardly from the table, a discharge platform rearwardly and upwardly positioned from the toothed member for receiving the wrappings engaged thereby and for discharging the empty wrappings, and means disposed beneath the table for receiving loose materials shaken from the table by said oscillating means.

12. In an apparatus for segregating materials from wrappings in which they are held, which apparatus has a support frame, a table mounted for movement in the frame adapted to support wrapped materials thereon, drive means mounted in the frame connected to the table for vigorously reciprocating the table whereby wrapped materials on the table are shaken to separate the materials from their wrappings, an elongated member rotatably mounted in the frame adjacent to the table having fingers extended therefrom for snagging wrappings on the table, and means connected to the elongated member for rotating the member to bring the fingers into engagement with the wrappings for removal of the latter from the table.

References Cited in the file of this patent

UNITED STATES PATENTS

| | | |
|---|---|---|
| 855,525 | McNutt | June 4, 1907 |
| 1,085,162 | Rose | Jan. 27, 1914 |
| 2,452,418 | Zuckerman | Oct. 26, 1948 |
| 2,464,305 | Greaves | Mar. 15, 1949 |
| 2,632,290 | Andersen | Mar. 24, 1953 |